United States Patent Office
3,723,090
Patented Mar. 27, 1973

3,723,090
DICHLORO TRIFLUOROMETHYL BENZOIC ACIDS
AS AGROCHEMICAL AGENTS
William J. Houlihan, Mountain Lakes, N.J., assignor to
Sandoz-Wander, Inc., Hanover, N.J.
No Drawing. Continuation-in-part of application Ser. No.
816,084, Apr. 14, 1969, which is a continuation-in-part
of application Ser. No. 729,944, May 17, 1968,
now abandoned. This application Jan. 22, 1971, Ser.
No. 109,012
Int. Cl. A01n 9/24
U.S. Cl. 71—115                                                      9 Claims

ABSTRACT OF THE DISCLOSURE

Dichloro trifluoromethyl benzoic acids are prepared from dichloro trifluoro toluene and are useful as plant growth regulators and herbicides.

This application is a continuation-in-part of application Ser. No. 816,084, filed Apr. 14, 1969, which issued as U.S. Patent No. 3,592,842 on July 13, 1971 which in turn is a continuation-in-part of application Ser. No. 729,944, filed May 17, 1968, now abandoned.

This invention relates to fluoromethyl benzoic acids. More specifically it relates to dichloro trifluoromethyl benzoic acids, basic addition salts thereof such as the sodium or potassium salt, dichloro trifluoromethyl phenyl lithium intermediates therefor, and process for their preparation.

The benzoic acids of this invention may be represented by the formula

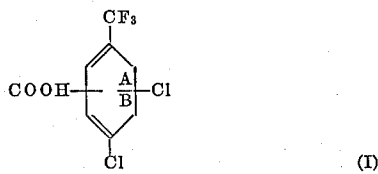

(I)

provided that Cl, is restricted to either the A or B position, and when Cl is at A, COOH is at B.

More specifically, the preferred compounds of this invention are 2,6-dichloro-3-trifluoromethyl benzoic acid,

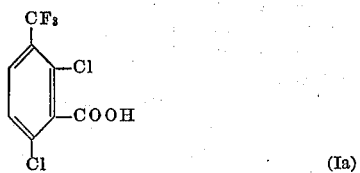

(Ia)

2,3-dichloro-5-trifluoromethyl benzoic acid

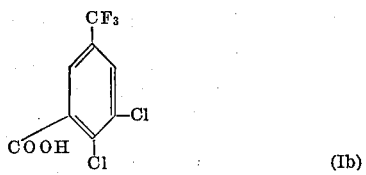

(Ib)

2,3-dichloro-6-trifluoromethyl benzoic acid

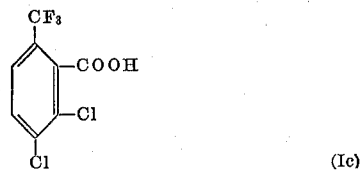

(Ic)

and 3,4-dichloro-6-trifluoromethyl benzoic acid

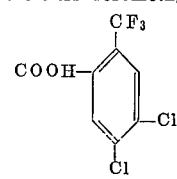

(Id)

The process for preparing the compounds of Formula I may be represented by the following reaction scheme:

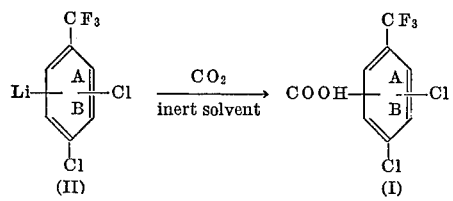

where Cl is restricted to either the A or B position; and when Cl is at A, Li and COOH are at B.

Compounds (I) are prepared by treating in an inert solvent a corresponding lithium intermediate compound of Formula II with carbon dioxide. The reaction may be conveniently carried out at a temperature of from −50° C. to 35° C. and preferably at a temperature of −10° C. to 10° C. The carbon dioxide used can be a solid or gas. The solvent may be lower hydrocarbons such as pentane, hexane, heptane and the like, ethers such as diethyl ether, dibutyl ether and the like, tetrahydrofuran and benzene.

The process for preparing compound (II) may be represented by the following reaction scheme:

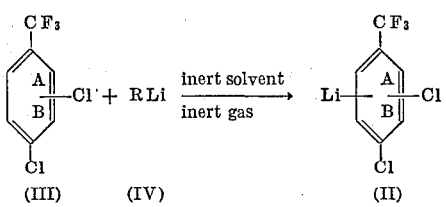

where Cl and Li have the above-stated restrictions, and R is a straight chain lower alkyl having 1 to 6 carbon atoms.

The intermediate lithium compound (II) may be prepared by reacting a dichloro-trifluorotoluene with a straight chain lower alkyl lithium compound (IV) having 1 to 6 carbon atoms in a solvent in the presence of an inert gas. The preferred alkyl lithium compound is butyl lithium. The solvent may be lower hydrocarbons such as pentane, hexane, heptane, and the like, ethers such as diethyl ether, dibutyl ether, and the like, tetrahydrofuran and benzene. The inert gas may be nitrogen, helium, argon, and the like. The reaction conveniently takes place at temperatures of −60° C. to −30° C. with the preferred temperature range being −50° C. to −40° C.

When the starting material of Formula III is 2,4-dichloro-α,α,α-trifluorotoluene,

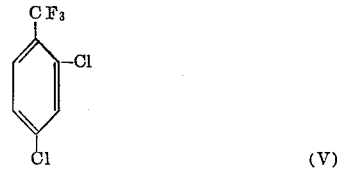

(V)

the lithium intermediate is 2,6-dichloro-3-trifluoromethyl-phenyl lithium having the structural formula

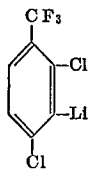

(VI)

When the starting material of Formula III is 3,4-dichloro-α,α,α-trifluorotoluene,

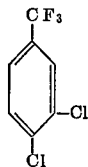

(VII)

the lithium intermediate can be represented by the structural formula

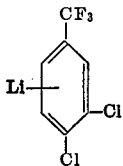

(VIII)

Using the reaction described above for compound (I), compounds (Ia), (Ib), (Ic) and (Id) can be prepared. When 2,4-dichloro-α,α,α-trifluorotoluene (V) is the starting material, the 2,6-dichloro-3-trifluoromethyl benzoic acid (Ia) is obtained. Starting with 3,4-dichloro-α,α,α-trifluorotoluene (VII) a mixture of the 2,3-dichloro-5-trifluoromethyl benzoic acid (Ib), 2,3-dichloro-6-trifluoromethyl benzoic acid (Ic) and 3,4-dichloro-6-trifluoromethyl benzoic acid (Id) is obtained with the 2,3-dichloro-5-trifluoromethyl benzoic acid (Ib) predominating. Conventional recovery techniques are utilized for obtaining the products (Ia), (Ib), (Ic) and (Id).

These acids may be converted to and from the basic addition salts using conventional techniques, such as suspending or dissolving the acid in water and treating the resulting material with a base, such as sodium hydroxide.

The compounds of Formula III are known and are prepared by methods disclosed in the literature.

The trifluoromethyl benzoic acids represented by Formula I above, and their non-toxic basic addition salts, are useful because they possess pharmacological properties in animals, such as mammals. In particular, these compounds are useful as CNS depressants as indicated by their activity in mice given a 200 mg./kg. of active agent and tested according to the 30-word adjective check sheet system basically described by Irwin S. (Gordon Research Conference, Medicinal Chemistry, 1959) and Chen (Symposium on Sedative and Hypnotic Drugs, Williams and Wilkins, 1954).

These trifluoromethyl benzoic acids or their salts may be combined with a pharmaceutically acceptable carrier or adjuvant. They may be administered orally or parenterally. For this use, the dosage will vary depending upon the mode of administration utilized and the particular compound employed. However, in general, satisfactory results are obtained when the compounds are administered at a daily dosage of from about 5 milligrams to 200 milligrams per kilogram of animal body weight. This daily dosage is preferably given in divided doses, e.g., 2 to 4 times a day, or in sustained release form. For most large mammals, the total daily dosage is from about 250 to 750 milligrams, and dosage forms suitable for internal administration comprise from about 60 milligrams to about 375 milligrams of the compound in admixture with a solid or liquid pharmaceutical carrier or diluent.

A representative formulation suitable for oral administration is a tablet prepared by standard tabletting techniques which contains the following:

| Ingredient: | Parts by weight |
|---|---|
| 2,6-dichloro-3-trifluoromethyl benzoic acid | 25 |
| Tragacanth | 2 |
| Lactose | 64.5 |
| Corn starch | 5 |
| Talcum | 3 |
| Magnesium stearate | 0.5 |

The compounds of this invention are also useful as agrochemical agents, particularly as plant growth regulators and as herbicides and may be used for controlling the growth of plants or for the destruction or prevention of weeds or unwanted plants.

They may be used as such on their own or preferably in combination with an agriculturally or herbicidally acceptable diluent or carrier.

The compounds of the Formula I in the form of free acids or as agriculturally or herbicidally acceptable basic addition salts may be worked up to give agrochemical compositions of which the exact nature may vary greatly depending on the intended use. These compositions may be worked up in the usual way, if desired with the addition of adjuvants, to give preparations which may be used in the form of solutions, emulsions, suspensions, pastes, powders, strewing agents, dusting agents and granulates, if desired, after further dilution. Liquors for application in the control of plant growth or for use as herbicides should contain at least 0.0001 and preferably up to about 1% of an active agent of this invention. It is also within the scope of the present invention to incorporate into these agrochemical compositions adjuvants which facilitate distribution and increase the adhesion and stability to rain.

Depending on the purpose for which the preparation is to be used, it is possible to add other materials having an influence on plant growth, for example, in order to widen the effect spectrum.

Agrochemical preparations containing a compound of this invention may be used in conventional manner, e.g., (a) by emulsification or suspension of the preparation in water and spraying the plants to be treated, for example, by sprinkling or spraying a locus to be cultivated or protected before the germination of any weeds, (b) by dusting already existing weeds, or (c) by direct application of a dusting or strewing agent or granulate to the locus to be cultivated. If desired, the preparation may also be worked into the ground.

The plant growth regulator effective dosage and the herbicide sufficient dosage will naturally vary depending upon such factors as the desired effect, the age of the plants, the culture medium, ambient temperature, humidity and light. The compounds of Formula I will generally be applied at a dosage of 0.05–1.5 pounds per acre to produce satisfactory plant growth regulator effect and 2–30 pounds per acre to produce a satisfactory herbicidal effect. An appropriate non-selective dosage is 0.5–1.5 pounds per acre for plant growth regulation and 10–30 pounds per acre for herbicidal action, whereas a dosage suitable for selective agrochemical action is 0.05–0.5 pound per acre for plant growth regulation and 2–10 pounds per acre for herbicide activity. Methods employed to determine the plant growth regulator activity of the compounds of Formula I are as follows:

Test Method A: Cell elongation

Plant: *Cucumis sativus* L.

Cucumber seeds are pregerminated at approximately 25° C. in Molisch dishes on moist filter paper in the dark. After 4 days seedlings whose hypocotyls are 6 to 7 cm. in length are selected. Hypocotyl segments are prepared by cutting the hypocotyls with a razor blade 3.0 cm. below the base of the cotyledons. Cotyledons are removed or left attached to the segments. Sets of 10 hypocotyl segments are incubated at 25° C. in the dark in covered dishes each containing 50 cc. of test solution.

The test solutions employed (Knop nutrient solutions diluted with water to 1/5) contain the test compounds in concentrations of 100, 10, 1 and 0.1 p.p.m. After 48 hours the length of the hypocotyls are measured and compared with control plants. All manipulations except the length measurements are carried out in red light in a dark room.

Test Method B: Germination rate, shoot and root growth (cell elongation and cell division)

Plant: *Avena sativa* L.

Oat seeds are placed on a wire gauze having a mesh of appropriate size. The gauze touches the surface of a Knop nutrient solution in a beaker, the solution containing the test compounds in concentrations of 10, 1 and 0.1 p.p.m. Fifteen seeds are used per beaker. The germination rate is determined and the longitudinal growth of the shoots as well as of the roots and other growth effects (e.g. curvatures) are evaluated visually in comparison with control plants.

Test Method C: Leaf abscission (defoliation)

Plant: *Phaseolus vulgaris* L.

Explants are prepared from 3 week old bean plants (cultivation carried out in a mixture of peat medium substrate and sand). The explants consist of the petiole stumps of the primary leaves and a part of the epicotyl attached. The compounds to be tested are mixed in concentrations of 1000, 100 and 10 p.p.m. with 0.1% warm agar. 5 microliters of the still warm mixture are applied on the cut surface of the petioles with a syringe. The number of petioles that abscise after application of constant pressure is recorded daily and compared with the number of petioles abscised of the control plants (pure 0.1% agar).

The invention is illustrated, but in no way limited, by reference to the following examples.

EXAMPLE 1

2,6-dichloro-3-trifluoromethyl benzoic acid

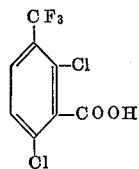

170 g. (0.79 mole) of 2,4-dichloro-α,α,α-trifluorotoluene and 1000 ml. of absolute tetrahydrofuran were charged to a flask equipped with stirrer, dropping funnel, carbon dioxide condenser and gas inlet tube. The system was flushed with dry nitrogen and cooled (carbon dioxide-acetone bath) to an internal temperature of −50° C. A 660 ml. solution of 15% n-butyllithium (1.06 mole n-butyllithium) in hexane was added dropwise (20 minutes) to the flask. The resulting dark red-purple solution containing 2,6-dichloro-3-trifluoromethyl phenyl lithium was maintained at −50° C. for about one hour, and then poured onto a slurry of 750 g. powdered carbon dioxide and 250 ml. diethyl ether. After standing for about 20 hours at room temperature, the residue was treated with 750 ml. of 2 N sodium hydroxide. The caustic layer was washed with toluene, acidified with concentrated HCl, extracted twice with 200 ml. of methylene chloride and dried with sodium sulfate. The methylene chloride layer was filtered and the solvent removed in vacuo. The residue was crystallized from heptane to give 2,6-dichloro-3-trifluoromethyl benzoic acid; M.P. 90°–92° C.

EXAMPLE 2

2,3-dichloro-5-trifluoromethyl benzoic acid

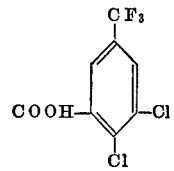

2,3-dichloro-6-trifluoromethyl benzoic acid

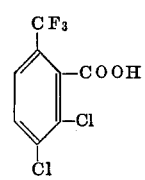

3,4-dichloro-6-trifluoromethyl benzoic acid

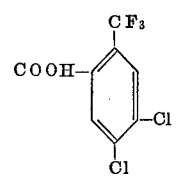

56.5 g. (0.263 mole) of 3,4-dichloro-α,α,α-trifluorotoluene and 500 ml. of absolute tetrahydrofuran were charged to a flask equipped with stirrer, dropping funnel, carbon dioxide, condenser and gas inlet tube. The system was flushed with dry nitrogen and cooled (carbon dioxide-acetone bath) to an internal temperature of −50° C. A 220 ml. solution of 15% n-butyllithium (0.352 mole) in hexane was added dropwise (20 minutes to the flask). The resulting dark red-purple solution containing the phenyl lithium intermediates of Formula VIII above was maintained at −50° C. for about one hour, and then poured onto a slurry of 350 g. powdered carbon dioxide and 150 g. diethyl ether. After standing for about 20 hours at room temperature the residue was treated with 300 ml. of 2 N sodium hydroxide. The caustic layer was washed with toluene, acidified with concentrated HCl, extracted twice with 200 ml. of methylene chloride and dried with sodium sulfate. The methylene chloride layer was filtered and the solvent removed in vacuo. The residue was crystallized from heptane to give mainly a mixture of 2,3-dichloro-3-trifluoromethyl benzoic acid, 2,3-dichloro-6-trifluoromethyl benzoic acid, and 3,4-dichloro-6-trifluoromethyl benzoic acid.

EXAMPLE 3

A test tube having a ¼ inch hole at the bottom is plugged at the hole with some glass wool. The test tube is then filled to about 1½ inches from the top with quartz sand which is made inert by washing with acetone-distilled water (1:1), distilled water, and dried. Seed of the plant to be tested is planted in the sand. The tube is fitted with a rubber collar and suspended in an Erlenmeyer flask containing conventional KNOPS nutrient solution and the active agent of this invention at a concentration of 50 parts per million (no active agent in check). The apparatus is placed under fluorescent lights for about three weeks and once daily, the bottom of the tube is dipped into the solution. The results are noted below when 2,6-dichloro-3-trifluoromethyl benzoic acid is used as active agent:

PERCENT OF CHECK

| Test species | Plant/ seeds | Height | Root length | Comments |
|---|---|---|---|---|
| Field Corn #8 | 2/4 | 6 | 17 | Extreme epinasty, then death; roots extremely stunted and extremely discolored. |
| Annual ryegrass | 2/4 | 8 | 9 | Extreme epinasty and much necrosis then death; roots extremely sparse and extremely stunted. |
| Barnyard grass | 4/4 | 9 | 29 | Extreme epinasty, then death; roots extremely sparse and extremely stunted. |
| Wild oat | 0/4 | 0 | 0 | No germination. |
| Johnsongrass | 0/4 | 0 | 0 | Do. |
| Wheat (Red Coat) | 3/4 | 4 | 3 | Extreme epinasty, then death; roots extremely sparse and extremely stunted. |
| Soybean (Adelphia) | 0/4 | 0 | 0 | No germination. |
| Coffeeweed | 0/4 | 0 | 0 | Do. |
| Field bindweed | 0/4 | 0 | 17 | No germination; roots extremely stunted and extremely discolored. |
| Redroot pigweed | 6/8 | 15 | 7 | Extreme epinasty, then death; roots extremely stunted. |
| Cocklebur | 0/1 | 0 | 8 | No germination; roots extremely stunted and extremely discolored. |
| Cotton (Coker 201) | 0/4 | 0 | 22 | Do. |

EXAMPLE 4

Using the procedure outlined in Example 3 and 2,3-dichloro-5-trifluoromethyl benzoic acid as the active agent, the following results are obtained:

PERCENT OF CHECK

| Test species | Plant/ seeds | Height | Root length | Comments |
|---|---|---|---|---|
| Field Corn #8 | 4/4 | 47 | 22 | Chlorosis and much epinasty, then death; roots extremely stunted and extremely discolored. |
| Annual ryegrass | 4/4 | 75 | 69 | Very slight necrosis. |
| Barnyard grass | 3/4 | 88 | 48 | Very slight chlorosis; roots stunted. |
| Wild oat | 1/4 | 56 | 100 | Very slight epinasty. |
| Johnsongrass | 3/4 | 67 | 110 | Do. |
| Wheat (Red Coat) | 3/4 | 49 | 83 | Minor epinasty. |
| Soybean (Adelphia) | 4/4 | 22 | 75 | Extreme epinasty. |
| Coffeeweed | 4/4 | 60 | 100 | Epinasty; roots sparse. |
| Field bindweed | 3/4 | 11 | 50 | Much epinasty; roots extremely stunted and extremely sparse. |
| Redroot pigweed | 5/8 | 15 | 14 | Chlorosis and epinasty, then death; roots extremely stunted. |
| Cocklebur | 1/1 | 39 | 21 | Much epinasty, then death; roots greatly stunted. |
| Cotton (Coker 201) | 4/4 | 53 | 111 | Epinasty, then death, possibly due to fungal attack; roots extremely sparse. |

EXAMPLE 5

Dust formulations

The following compositions are adapted for direct application as dusts for controlling the growth of plants or for the destruction or prevention of weeds using conventional dusting equipment. The dusts are made by blending or mixing the ingredients and grinding the mix to give compositions having an average particle size less than about 50 microns.

A

| | Parts |
|---|---|
| 2,6-dichloro-3-trifluoromethyl benzoic acid | 20 |
| Talc | 80 |
| | 100 |

B

| | Parts |
|---|---|
| 2,3-dichloro-5-trifluoromethyl benzoic acid | 5 |
| Cottonseed oil | 4 |
| Walnut shell flour | 91 |
| | 100 |

EXAMPLE 6

Water-dispersible liquid compositions

The following compositions are in a liquid form and are adapted for addition to water to give aqueous dispersions for application as sprays. The liquid or fluid compositions shown are prepared by thoroughly mixing and dispersing active compounds and conditioning agent or agents in an organic liquid diluent.

A

| | Parts |
|---|---|
| 2,3-dichloro-6-trifluoromethyl benzoic acid | 25 |
| Long chain fatty alcohol sulfate (emulsifying agent) | 2 |
| Goulac (dispersing agent) | 3 |
| Kerosene | 70 |
| | 100 |

B

| | Parts |
|---|---|
| 3,4-dichloro-6-trifluoromethyl benzoic acid | 30 |
| Akylated aryl polyether alcohol (wetting and emulsifying agent) | 3 |
| Methyl cellulose (dispersing agent) | 1 |
| Kerosene | 66 |
| | 100 |

What is claimed is:

1. An agrochemical composition having plant growth regulating and herbicidal activity comprising as active ingredient an effective amount of a compound of the formula

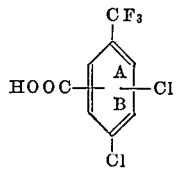

provided that Cl is restricted to either the A or B position; and when Cl is at A, COOH is at B, or an agriculturally acceptable salt thereof in association with an agricultural carrier or diluent.

2. A plant growth regulator composition comprising as active ingredient a plant growth regulator effective amount of a compound of the formula

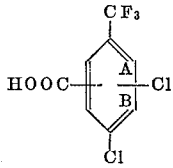

where the provisos are as set out in claim 1, or an agriturally acceptable salt thereof in association with an agricultural carrier or diluent.

3. A composition according to claim 2 wherein the compound is 2,6-dichloro-3-trifluoromethyl benzoic acid.

4. A composition according to claim 2, wherein the compound is 2,3-dichloro-5-trifluoromethyl benzoic acid.

5. A method of controlling the growth of a plant comprising applying to a plant or to a plant locus, a plant regulating effective amount of a composition according to claim 2.

6. A composition suitable for the destruction or prevention of weeds or unwanted plants, comprising, in an amount sufficient to exert a herbicidal action, a compound of the formula where the provisos are as set out in claim 1, or an agriturally acceptable salt thereof in association with an agricultural carrier or diluent.

7. A composition according to claim 6 wherein the compound is 2,6-dichloro-3-trifluoromethyl benzoic acid.

8. A composition according to claim 6 wherein the compound is 2,3-dichloro-5-trifluoromethyl benzoic acid.

9. A method for the destruction or prevention of weeds or unwanted plants, which comprises applying to a locus to be protected, in an amount sufficient to exert a herbicidal action, a composition according to claim 6.

References Cited
UNITED STATES PATENTS

| | | | |
|---|---|---|---|
| 3,573,032 | 3/1971 | Fellig | 71—115 |
| 3,282,991 | 11/1966 | Klein et al. | 71—115 |
| 3,224,865 | 12/1965 | Carlson | 71—115 |

LEWIS GOTTS, Primary Examiner

C. L. MILLS, Assistant Examiner